May 19, 1931.  H. M. PFLAGER  1,806,415
RAILWAY BOOSTER MOTOR
Filed March 17, 1927    3 Sheets-Sheet 1
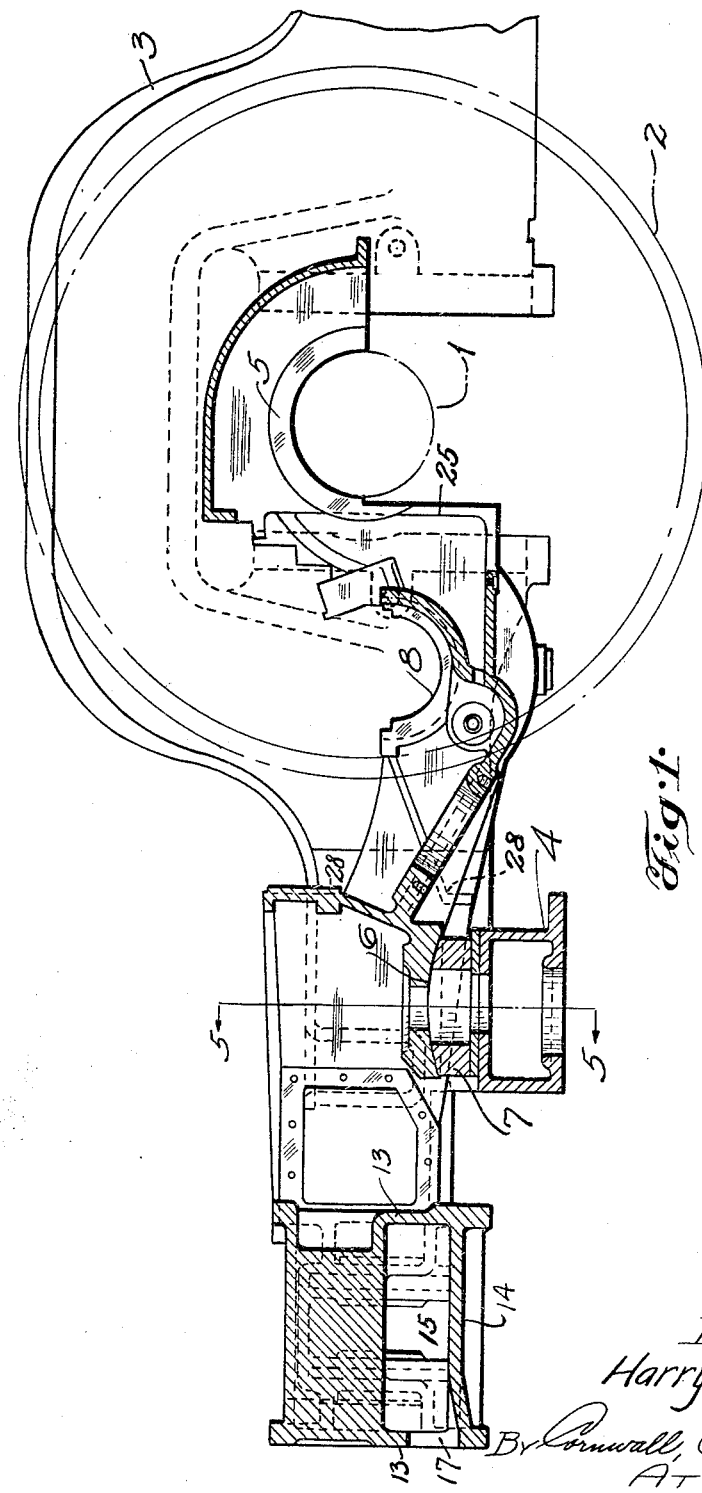

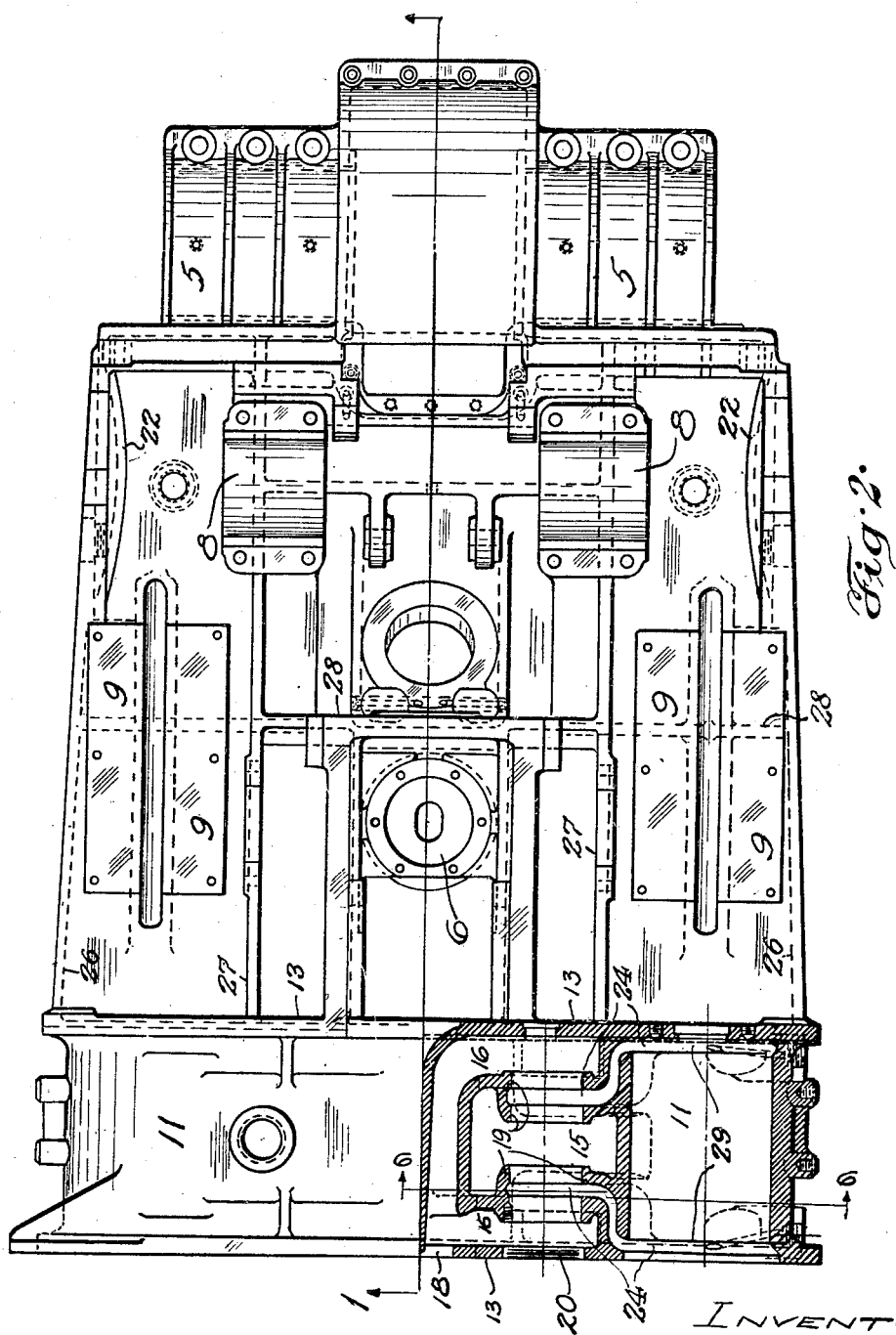

May 19, 1931.   H. M. PFLAGER   1,806,415
RAILWAY BOOSTER MOTOR
Filed March 17, 1927   3 Sheets-Sheet 3
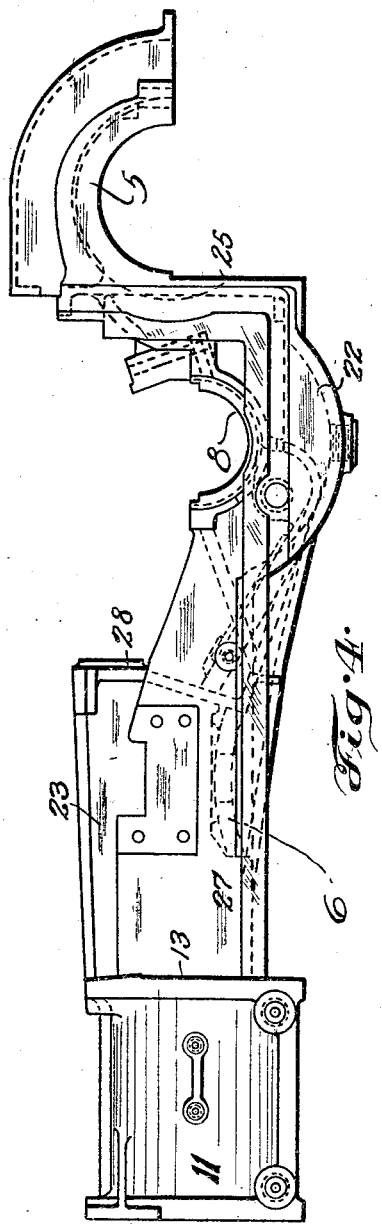
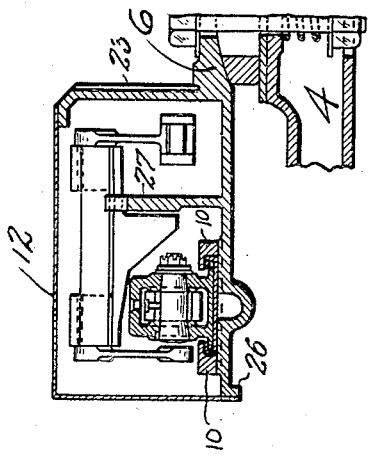
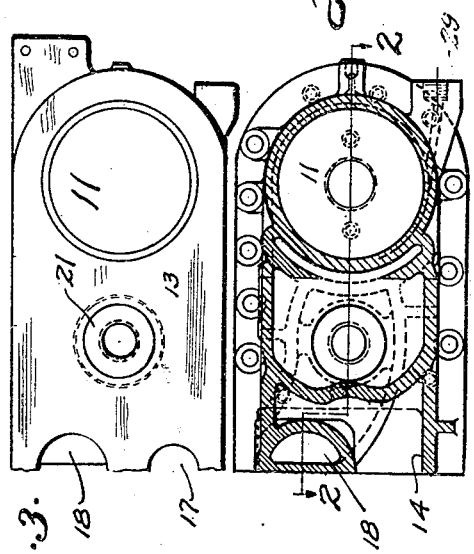
INVENTOR
Harry M. Pflager
By Cornwall, Bedell & Janus
ATTORNEYS Patented May 19, 1931

1,806,415

UNITED STATES PATENT OFFICE

HARRY M. PFLAGER, OF ST. LOUIS, MISSOURI, ASSIGNOR, BY MESNE ASSIGNMENTS, TO GENERAL STEEL CASTINGS CORPORATION, OF GRANITE CITY, ILLINOIS, A CORPORATION OF DELAWARE

RAILWAY BOOSTER MOTOR

Application filed March 17, 1927. Serial No. 176,105.

My invention relates to railway rolling stock and consists in an improvement in booster engines such as are applied to axles of a locomotive or its tender which ordinarily are idle but which become drivers when the booster is operating.

In all booster engine installations with which I am familiar, there is an engine bed of substantial extent and weight upon which is mounted the engine cylinders and other parts of the engine structure. A typical embodiment of such a structure is illustrated in Patent No. 1,401,553 issued to me December 27, 1921.

The main object of my present invention is to produce a booster engine structure which will be lighter in weight than those previously used and at the same time will be stronger for their intended purpose and which will eliminate the possibility of the mounting of cylinders on their bed being loosened and the cylinders thrown out of the best operative relation with the other parts of the engine.

Another object of my invention is to simplify the booster structure by eliminating a number of separately formed parts.

I accomplish these objects by forming the engine cylinders and associated parts integrally with the bed plate and preferably by casting in one piece the bed plate and cylinders and various other portions of the booster engine such as the steam passages, and piston valve bearings.

In the accompanying drawings which illustrate a selected embodiment of my invention—

Figure 1 is a vertical longitudinal section through the center of my improved booster motor casting showing the same applied to a locomotive trailer truck such as are in common use. The section is taken on line 1—1 of Figure 2.

Figure 2 is a top view of the booster motor casting, a part being shown in horizontal section along the line 2—2 of Figure 6.

Figure 3 is a one-half rear end elevation of the same.

Figure 4 is a side elevation of the same.

Figure 5 is a fragmentary transverse vertical section taken on line 5—5 of Figure 1.

Figure 6 is a one-half transverse section taken on line 6—6 of Figure 2.

The booster engine illustrated in Figure 1 is applied to a truck having an axle 1 and wheels 2 which ordinarily have no driving function but serve to support a portion of the superstructure through the truck frame comprising wheel pieces 3 and a rear transom 4. The booster engine is mounted upon the axle 1 and the transom 4, the engine bed being provided with transversely spaced, downwardly facing bearings 5, for engaging the axle, and with a central, downwardly facing spherical bearing 6 spaced from bearings 5 longitudinally of the bed and adapted to engage a cooperating bearing element 7 mounted on the truck transom 4.

Intermediate bearings 5 and 6 the bed is provided with transversely spaced, upwardly facing bearings 8 in which the crank shaft of the booster engine may be journaled. At the sides of bearing 6, the bed is provided with pads 9 for mounting the cross head guides 10.

Spaced from the outer end of bearings 8 are vertical members 22 forming side walls for the space required for the engine crank shaft. Spaced from the bearing 6 are vertical members 23 forming side walls for the compartments in which the valve gear mechanism operates. Vertical members 13 and 25 form end walls for the compartments inclosing the valve gear mechanism, cross heads, connecting rods and crank shaft, and these end walls together with members 22 and 23 and with suitable flanges 26 along the horizontal bottom member of the bed cooperate to mount the separately formed cover plates 12. Suitable reinforcing webs 27 and 28 extend longitudinally and transversely of the bed to reinforce members 22, 23, 13, 25 and 26 and also reinforce bearings 6 and 8 and the horizontal member of the bed.

The engine cylinders 11 are formed integrally with the remainder of the bed plate and form the bulk of the rear portion of the latter, thereby avoiding excess metal as is present in a structure including a bed plate and separate cylinder elements above the same. Preferably the lower portions of the cylinders project downwardly from the bed plate bringing the axes of the cylinders closer to the bed plate and reducing the size of the cross head, or its guides.

Integral with the cylinder are cylinder connecting members 13 and 14 which with suitable webs form steam passages 15 and 16 leading from the inlet at 17 to the cylinders and from the latter to the outlet at 18.

Between each passage 16 and the adjacent cylinder 11, there is a passageway 24 which functions as an inlet passage or an outlet passage according to the position of the steam valve. The bottom of each passageway 24 is concaved downwardly and a downwardly inclined conduit 29 leads from the lowermost portion of each passageway 24 to the exterior of the structure whereby waters of condensation may be drained from the cylinders and steam passages. The casting includes a chest for the steam control valve and flanges 19 form bearing elements for the piston valve (not shown) which is inserted through the opening 20 normally closed by a plug 21. Preferably a bushing is mounted on flanges 19 and thereby the bearing surface may be renewed from time to time.

By forming all of the engine parts mentioned in a single casting it is obvious that a stronger structure can be provided for a given amount of material and that there will be no opportunity for the cylinders and other elements to work loose from the bed or each other as is possible when the parts are formed separately and are bolted to the bed.

While I have illustrated a booster engine mounted upon the axle and transom of a locomotive trailer truck, it is to be understood that my invention is applicable to a booster engine applied to one or more axles of a locomotive tender or applied to other idler axles of a locomotive whether the same are the usual trailer truck axles or otherwise, and whether the booster is entirely supported by a truck or is supported by the superstructure.

Suitable reinforcing ribs strengthen the casting and pads for attaching cover plates 12, and other detail parts of the casting may be used as desired and may be modified at will, and other variations in my preferred structure may be made without departing from the spirit of my invention as expressed in my claims.

I claim:

1. A booster engine bed plate construction comprising a substantially horizontally disposed main body, an integrally formed transversely extending wall at the rear end of said main body, the central portion of said wall being bulged rearwardly, and a longitudinally extending web extending rearwardly from the ridge of said bulged central portion as an integral continuation therefrom.

2. A booster engine bed plate construction comprising a main body plate, an integrally formed transversely extending wall at the rear end of said plate, and a plurality of integrally formed members extending rearwardly from the opposite edges of said transversely extending wall to constitute the outer walls of a pair of booster cylinders.

3. A booster engine bed plate construction comprising a main body plate, an integrally formed transversely extending wall at the rear end of said plate, and a rearwardly extending web portion joined integrally to the center of said rearwardly extending wall to constitute a common wall between a pair of valve chest ports.

4. A booster engine bed plate construction comprising a substantially horizontally disposed main body, an upright wall extending transversely of said body and integral therewith, the central portion of said wall having a rearward extension connected thereto by an arcuate section, a portion of said wall and said extension forming a steam passage.

5. A locomative booster engine frame integral structure comprising a horizontal bed plate, upright transverse webs thereon, a steam cylinder having an end wall formed by one of said webs and having side walls extending from said web and projecting below the level of said bed plate, and bearings for an engine crank shaft and a truck axle merging with the other of said webs.

6. A locomotive booster engine frame integral structure comprising a horizontal bed plate, upright transverse webs thereon, a steam cylinder having an end wall formed by one of said webs and having side walls extending from said web and projecting below the level of said bed plate, and bearings for an engine crank shaft and a truck axle merging with the other of said webs, there being cross head guide slides formed on said bed plate between said wall forming web and said crank shaft bearings.

7. A one piece casting comprising a locomotive booster engine cylinder, bed plate structure extending forwardly from the end of said cylinder and intermediate the top and bottom thereof, there being an upright web spaced from said cylinders, and crank shaft bearing elements in said structure on one side of said web, and truck axle bearing elements in said structure on the other side of said web.

In testimony whereof I hereunto affix my signature this 11th day of March, 1927.

H. M. PFLAGER.